United States Patent [19]

Obelode et al.

[11] Patent Number: 4,935,642

[45] Date of Patent: Jun. 19, 1990

[54] CIRCUIT FOR DISTRIBUTING ELECTRICAL POWER TO SEVERAL FUNCTIONAL UNITS

[75] Inventors: Juergen Obelode, Steinhagen; Hans-Bodo Laue, Altenbeken, both of Fed. Rep. of Germany

[73] Assignee: Nixdorf Computer AG, Paderborn, Fed. Rep. of Germany

[21] Appl. No.: 145,435

[22] Filed: Jul. 19, 1988

[30] Foreign Application Priority Data

Jan. 20, 1987 [DE] Fed. Rep. of Germany ....... 3701493

[51] Int. Cl.$^5$ .......................... H02H 3/24; H02J 1/04
[52] U.S. Cl. ........................................ 307/32; 307/34; 307/38; 340/310 A; 340/310 R
[58] Field of Search .................... 307/31–41, 307/151, 149, 147; 340/310 R, 310 A, 310 CP, 825.05, 825.06, 825.07, 825.16; 370/58, 13, 14, 67; 379/102–106, 61, 63, 88, 196, 211; 375/45; 361/91, 92, 93

[56] References Cited

U.S. PATENT DOCUMENTS

| | | | |
|---|---|---|---|
| 3,858,110 | 12/1974 | Breitmeier | 307/39 |
| 4,088,940 | 5/1978 | Ciarniello et al. | 307/38 X |
| 4,137,557 | 1/1979 | Ciarniello et al. | 361/92 |
| 4,138,607 | 2/1979 | Engelmann | 307/41 X |
| 4,167,679 | 9/1979 | Leyde et al. | 307/35 |
| 4,206,443 | 6/1980 | Britton | 340/825.06 |
| 4,269,087 | 2/1981 | Sundberg | 307/35 |
| 4,310,770 | 1/1982 | Keener et al. | 307/35 |
| 4,321,582 | 3/1982 | Banghart | 340/310 R |
| 4,386,436 | 5/1983 | Kocher et al. | 340/310 R X |
| 4,439,784 | 3/1984 | Furukawa et al. | 340/310 A X |
| 4,461,690 | 7/1984 | Rolff et al. | 307/34 X |
| 4,471,232 | 9/1984 | Peddie et al. | 307/38 X |
| 4,472,640 | 9/1984 | Elmer | 307/38 X |
| 4,513,382 | 4/1985 | Faulkner, Jr. | 340/825.06 X |
| 4,553,204 | 11/1985 | Hashimoto | 307/34 X |
| 4,659,943 | 4/1987 | Virant | 307/39 |
| 4,663,539 | 5/1987 | Sharp et al. | 307/38 |
| 4,694,192 | 9/1987 | Payne et al. | 307/38 X |

Primary Examiner—William M. Shoop, Jr.
Assistant Examiner—Paul Ip
Attorney, Agent, or Firm—Dykema Gossett

[57] ABSTRACT

The invention concerns the distribution of electric power to several functional units (10, 11, 12) with variable power consumption. A preset limit value (Pmax) of the total power supply which is lower than the sum of the highest possible individual powers (P10, P11, P12) is maintained. By evaluating the total power consumption (I) or the operating voltage (U) of all functional units (10, 11, 12), an increase in the supply current or a drop in operating voltage (U) is used to reduce the supply current (I3) of functional units(12) of a lower importance is favor of the supply current of functional units (11) of a higher importance. This invention is used especially in electrical telephone subscriber's stations that are supplied over the subscriber's line.

17 Claims, 3 Drawing Sheets

CIRCUIT FOR DISTRIBUTING ELECTRICAL POWER TO SEVERAL FUNCTIONAL UNITS

TECHNICAL FIELD

This invention concerns a circuit arrangement for distributing electrical power to several functional units with variable power consumption while maintaining a preset limit value of the total power supply which is lower than the sum of the highest possible individual unit powers, especially for line-supplied systems, especially telephone systems.

BACKGROUND ART

When an electronic system that contains several functional units with variable power consumption is to be supplied with power and the capacity of the power source is limited, then a limit value may be preset for the total power consumption which would be exceeded if all functional units of the system were to be supplied at their highest possible individual power consumption. Then there is the problem of distibuting the electrical power according to the operating status of the functional units in such a way that functional units with a higher priority do not experience any impairment in operation whereas a reduction in power can be accepted temporarily for functional units of a lower priority. A limit on the total power supply may be due to the fact that power supply equipment intentionally delivers only limited power, or the power may be distributed over comparatively thin and long lines.

One example of an electrical system in which several functional units are to be supplied with at least partially variable power consumption and at the same time a limit value for the total power is given is a so-called "intelligent" telephone subscriber's station that is supplied over subscriber's lines from the central battery of a telephone system. Such a telephone subscriber's station contains control circuits that have relatively low power demand because they are usually in the form of microprocessors. On the other hand, they also contain functional units with a higher power demand that may contain amplifiers for telephone receivers and microphones plus, optionally, those for speakerphones. Such functional units consume different amounts of electricity depending on their modulation, and this change in demand may result in outage of the controlling functional unit due to insufficient power supply in cases of limited total available power. Thus, there is a need to maintain the power supply to functional units with a higher priority in any case and not impair them due to transient high-power demand by functional units of a lower priority.

In order to meet this requirement, the functional units may be dimensioned in such a way that the sum of all highest possible individual powers corresponds to this total power supply even with a maximum feeder line length, i.e., with minimum total available power. However, this has the disadvantage that the dimensions of the circuit must be based on maximum line length, and thus the available power supply is not fully utilized when such a system is used with short line lengths. It is also possible to maintain the operability of functional units that have the highest priority and which must always operate reliably regardless of the operating status of other functional units for a brief period of time without power consumption over the feeder line. Such a solution has the disadvantage that mechanical two-way contacts and/or additional local power sources must be provided. In the wake of the development of progressively more efficient telephone subscriber's stations that have relatively extensive display fields and new power features using digital technology, an increase in power supply to the corresponding functional units is unavoidable. This especially affects the controlling functional units whose power demand is then such that a temporary interruption in power consumption is not technically justifiable even with additional power sources provided.

SUMMARY OF THE INVENTION

The goal of this invention is to provide for the distribution of electrical power to several functional units in which automatic distribution of available power is achieved in accordance with the priority of the functional units, and a present limit value of the total power demand cannot be exceeded due to this distribution.

A circuit arrangement of the type defined initially is designed to solve this problem according to this invention in such a way that an increase in power consumption by functional units of a higher priority causes a proportional reduction in power consumption by functional units of a lower priority if the range of the preset limit value is reached due to this increase.

Through this invention, it is thus possible to supply a system that is equipped with several functional units, e.g., a modern telephone subscriber's station, with electric power up to a given limit and to assure the power supply to functional units of the highest priority in any case by the fact that a rise in power demand by such functional units causes the distribution function to start. The requirement that the range of the preset limit value should be reached here means that the increase in power consumption by individual functional units is not evaluated directly, but instead the total power supplied to the system is monitored, and its approach to the preset limit is ascertained. When this occurs, due to an increase in power consumption by functional units, then a control criterion that occurs with it can be used for a proportional reduction in the current supplied to other functional units whose priority is lower so a temporary reduction in their power supply can be accepted. Due to this automatic function, a dynamic distribution of electric power is achieved, because there is a constant readjustment of the distribution depending on the operating status of the more important functional units, thus resulting in optimum utilization of the limited total power supply.

A current-limiting control may be provided for the functional units of higher priority according to another feature of this invention. This has the advantage that an increase in power consumption which may be caused by a short circuit or overload in these functional units does not lead to a complete outage of the functional units of the highest priority, because residual power within the total available power is then still maintained for them.

To reduce the power consumption for functional units of a lower priority, a control circuit may be provided whose control variable is related to the total power supplied to all functional units. Such a control circuit will be operative, e.g., in evaluating the total current, even if the supply current to a functional unit of a lower priority assigned to it is increased. This is associated with a further improvement in the principle of distribution of electrical power according to this invention, because a current-limiting function is also carried out directly on the functional unit of a lower priority.

The distribution of electrical power for an electronic telephone subscriber's station is described below as a practical example of this invention. The explanation will show that the invention is of general importance for comparable systems that are used not in telephone technology but in other fields, e.g., in data transmission technology or remote control technology.

DESCRIPTION OF PREFERRED EMBODIMENTS

Figure 1:
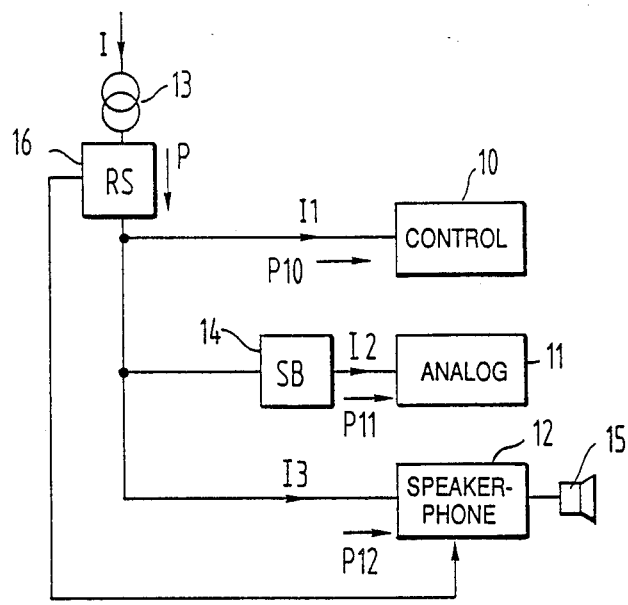
FIG. 1 shows a basic circuit diagram of the electrical power supply of a telephone subscriber's station.

FIG. 1 shows three functional units 10, 11 and 12 of a telephone subscriber's station in block diagram where the power supply is distributed over the subscriber's line 13 which is shown as a power source and supplies a total current I. Functional unit 10 serves to control the operating processes within the telephone subscriber's station and is supplied with a current I1 or a power P10. The operating processes that derive from operation of a keyboard and are necessary for representation of image on a display field, or are necessary in utilization of power features such as dialing with the handset hung up, hands-free talking or data transmission, are controlled with functional unit 10. Such control functions can be carried out with microprocessors that have a comparatively lower power consumption that must, however, be maintained regardless of the operating state of the telephone subscriber's station.

Functional unit 11 contains analog functions such as an electronic hybrid set, an audio amplifier and a microphone amplifier. It is supplied with a current I2 or a power P11 that may optionally assume relatively high values if an amplifier is overloaded, for example. However, the supply current I2 can also be limited to a permissible level with a current-limiting circuit 14. This current-limiting circuit 14 labeled as SB in the figure is connected in series with analog functional unit 10.

Functional unit 12 contains an amplifier for speakerphones. It is supplied with a current I3 or a power P12 and operates a loudspeaker 15. Here again, the supply current I3 can assume comparatively high values that depend on the modulation of the speakerphone amplifier. However, power consumption of functional unit 12 can also be limited or reduced by a control circuit 16 which is labeled as RS and is controlled in a manner that depends on the total power P as described below.

Functional units 10, 11 and 12 differ in their importance or priority for the distribution of the available electric power supply. Although functional unit 10 has a comparatively lower power consumption, continuous supply with supply current I1 must be assured without causing any impairments due to an increase in supply currents I2 and I3 of functional units 11 and 12. If the control functions performed with functional unit 10 can no longer be continued properly, then satisfactory operation of the telephone subscriber's station is no longer assured, and connections that have been established may be broken. The analog functions of functional unit 11, however, are of lesser importance, so functional unit 11 has a lower priority than functional unit 10 in distribution of the available electrical power. In order for the power supply of functional unit 10 to be assured at all times, the current-limiting circuit 14 is connected in series before functional unit 11. Its current-limiting effect permits an increase in supply current I2 for functional unit 11 on demand, but it prevents such current increases as those that can be caused by an overload or short circuit in the analog functions, for example. A variation in the current demand of these analog functions is possible, but only within the range given by the current-limiting circuit 14. This range may be of a size such that the current demand for the functional unit 10 can always be covered.

Functional unit 12 has the lowest importance in comparison with functional units 10 and 11, because a reduction in supply current I3 in favor of supply currents I1 and I2 can be accepted in this case. For example, this may be a case where a high current is needed for the microphone amplifier in functional unit 11 with a high sound pressure in the transmit mode of the telephone subscriber's station, whereas the speakerphone function of functional unit 12 is practically irrelevant in this operating status.

The distribution of the power supply to functional units 10, 11 and 12 is then accomplished by evaluating the total power P with control circuit 16, taking into account the priorities mentioned above. One example of such a distribution with a dynamic control process created by control circuit 16 is plotted graphically in FIG. 2. This plot shows the curve of the power supply P as a function of time t, where the total power Pmax supplied to the telephone subscriber's station is composed of the three individual powers P10, P11 and P12 which are supplied to functional units 10, 11 and 12. It is assumed here that the total power consumption is at its preset limit Pmax.

Figure 2:
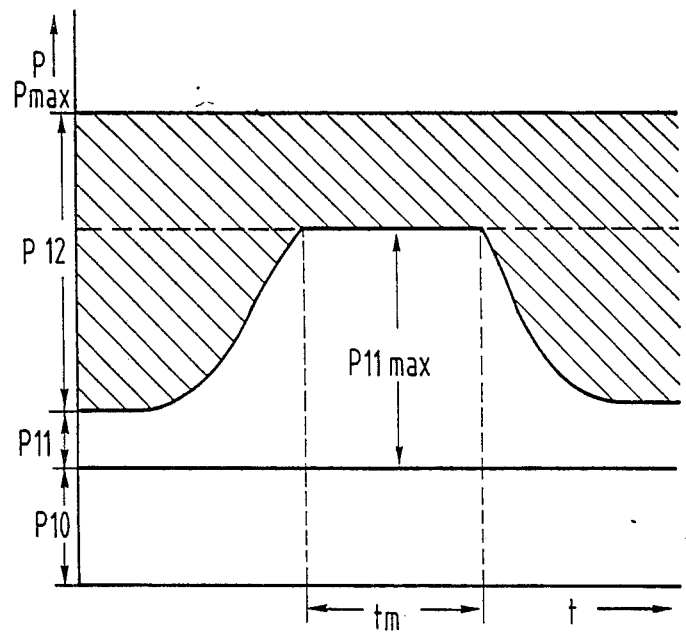
FIG. 2 shows a graphic plot of the dynamic distribution of electrical power to the functional units of the telephone subscriber's station.

The plot in FIG. 2 shows a change in power P11 which increases, starting from an initial value up to a value P11max. At the same time, the power P12 decreases proportionally, so the total power Pmax is maintained. This dynamic redistribution of powers P11 and P12 is created by the function of the control circuit 16 already described (FIG. 1). During the time tm, the power P11max then remains at a constant value, and after this time, power P11 drops back to a lower level which corresponds approximately to the initial level. At the same time, power P12 increases again to a corresponding value. FIG. 2 thus shows a transient increase in power P11 at the expense of power P12 in such a way that the total power Pmax remains at its preset limit. At the same time, it is assured that power P10 is always maintained. Due to the fact that power P11 is limited to the value P11max, this requirement is taken into account on the one hand while on the other hand this dimensioning prevents the supply power P12 from being interrupted.

Figure 3:
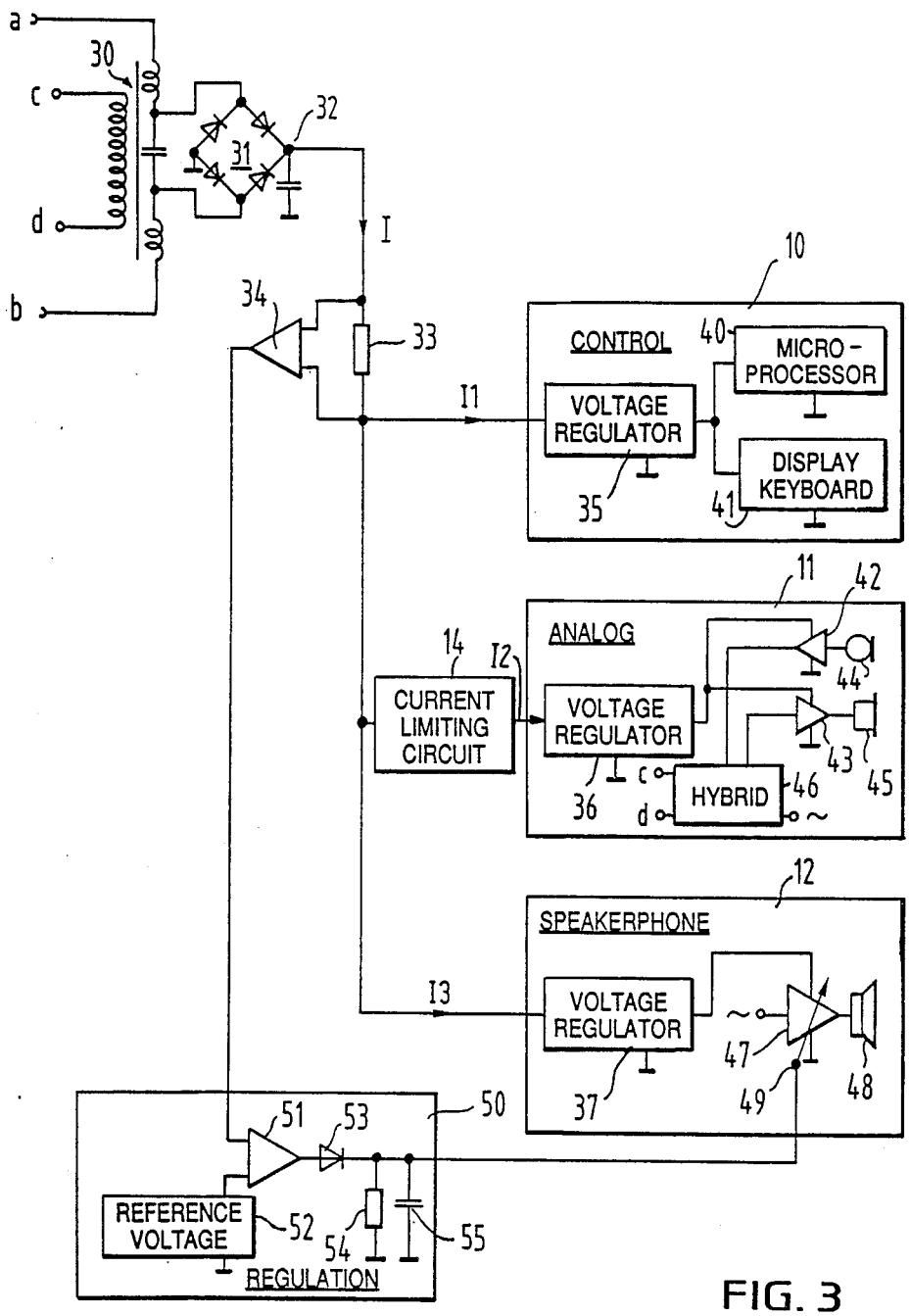
FIG. 3 shows another basic circuit diagram of the telephone subscriber's station with the feeder circuit and control circuit and with the total current as the controlled variable.

FIG. 3 shows a first version of the dynamic power distribution in a clearer diagram. This shows the telephone subscriber's station with its functional units 10, 11 and 12 that have already been explained and are supplied with power over the two wires a and b of the subscriber's line (not shown) from the central battery of the switching equipment. A repeating coil 30 makes it possible to decouple the speech a.c. voltage of the subscriber's line and is connected at its winding terminals c and d to the corresponding terminals inside functional unit 11. The analog functions and speech amplification are performed in functional units 11 and 12. The repeater 30 is also connected on the line side to a rectifier circuit 31 that serves as reverse battery protection and delivers the total supply current I at its terminal 32 for supplying functional units 10, 11 and 12 and making possible a total power supply whose limit Pmax must not be exceeded.

FIG. 3 shows the functions of functional units 10, 11 and 12 that have already been explained.

In addition, each functional unit 10, 11 and 12 has a voltage regulator 35, 36, 37 that corrects fluctuations in the supply voltage so the functions downstream from it always receive a uniform supply voltage.

The controlling functional unit 10 contains a microprocessor 40 as well as a control circuit 41 for controlling the functions of an information display and a keyboard. Functional unit 11 contains the analog functions of the two speech amplifiers 42 and 43 for a microphone 44 and a telephone receiver 45 as well as an electronic hybrid set 46, terminals c and d of which are connected to the corresponding terminals of repeater 30 and which is supplied by speech amplifier 42 and drives speech amplifier 43. Functional unit 12 contains a speakerphone amplifier 47 which supplies a loudspeaker 48 and is supplied from a hybrid set 46 by way of connecting devices that are not shown here. The speakerphone amplifier 47 is a controllable amplifier whose amplification can be set by a signal at its control input 49.

The current-limiting circuit 14 already explained above is connected upstream from functional unit 11.

The supply currents I1, I2 and I3 of functional units 10, 11 and 12 are the component currents of the total supply current I which is carried over a current-sensing resistor 33. The voltage drop that occurs at this resistor is proportional to the total supply current I and controls an operational amplifier 34 whose output signal is sent to the comparator input of a comparator 51 provided in regulating circuit 50. The reference input of this comparator 51 is driven with a reference voltage 52 that can be of a magnitude such that it corresponds to the output signal of the operational amplifier 34 which occurs when the total supply current I reaches or approaches the preset limit. When the voltage signal at the comparator input of comparator 51 exceeds reference voltage 52, comparator 51 delivers an output signal which adjusts the amplification of the speakerphone amplifier 47 over a diode 53 with a time constant produced through a resistor 54 and a capacitor 55 at control terminal 49 in such a way as to yield a reduction in the supply current I3 for this amplifier. This effect can be created by an increase in one of the supply currents I2 and I3. Control circuit 50 thus also fulfills the function of an automatic reduction in supply current I3 in addition to the function of a redistribution of the supply power when the supply current increases due to increased current consumption by speakerphone amplifier 47. When the increased supply current I2 or I3 drops again, the output signal of control circuit 50 disappears, and the previous power distribution status is reestablished.

In deviation from the practical example described above, the principle according to this invention can also be used with systems in which there are no functional units whose power is to be maintained continuously as in the case of functional unit 10 described above. It can readily be seen from FIG. 2 that the processes described here are not affected by the power supply P10.

Figure 4:
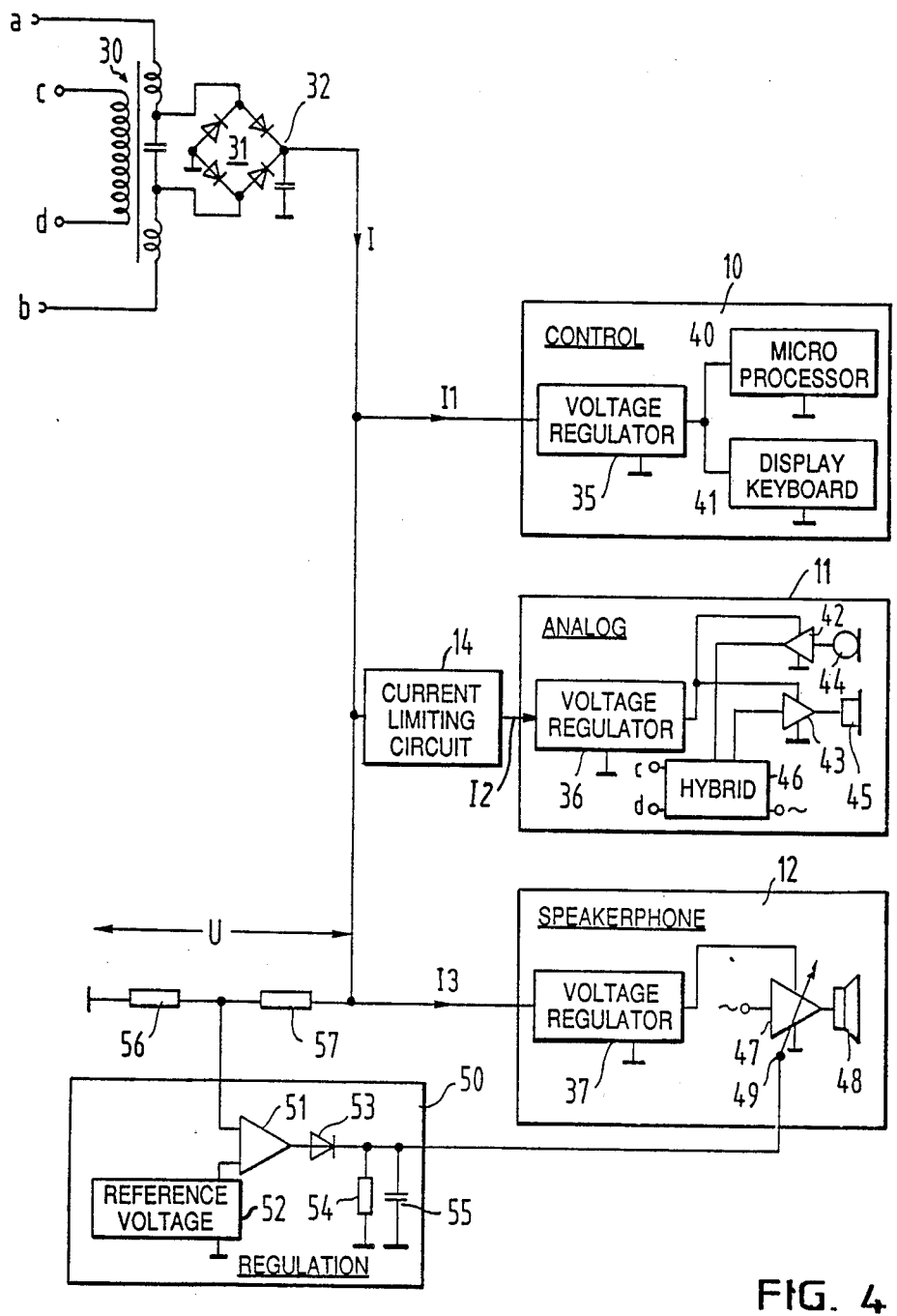
FIG. 4 shows another basic circuit diagram of the telephone subscriber's station with the operating voltage as a controlled variable.

FIG. 4 shows a telephone subscriber's station with the same design of functional units 10, 11, 12 and 14 as shown in FIG. 3, but here it is not the total current I that is evaluated to limit the power consumption but instead the operating voltage (labeled as U in FIG. 4) which is obtained from the source voltage of the central battery, minus the voltage drop at its internal resistor and the line resistances.

If the operating voltage U drops below a certain limit value which is derived, e.g., from one or more minimum input voltages of voltage regulators 35, 36 and 37, then the value Pmax of maximum power consumption is reached. Any further increase in power consumption I2 or I3 causes a drop below this preset limit due to a greater voltage drop at the internal resistor of the central battery. To evaluate this process, a voltage proportional to the operating voltage U is sent from the tap of a voltage divider with resistors 56 and 57 to the comparator input of comparator 51. If this voltage drops below the value given by reference voltage 52, then comparator 51 delivers an output signal that adjusts the control input 49 of speakerphone amplifier 47 by way of diode 53 and the time constant from resistor 54 and capacitor 55 in such a way that the operating voltage U increases again due to a lower power consumption.

The output signal at comparator 51 disappears again, but the control input 49 is still kept at the last value in accordance with the time constant of elements 54 and 55 described previously. Then a control process of the type already described can begin due to a renewed drop in voltage U.

We claim:

1. For use in delivering electrical power to line-fed subscriber stations in a telecommunications system, at least certain of said stations including a plurality of functional electrical units respectively having variable electrical power consumptions and differing priorities with respect to their functional importance, a circuit associated with each of said certain stations for limiting the total power consumed by all of the functional units of the associated station to a preselected limit, wherein said preselected limit is lower than the sum of the maximum power consumptions of the respective functional units of the associated station, said circuit comprising:
    means for sensing an electrical parameter related to the total power consumed by all of said functional units; and,
    control means, coupled with said sensing means and responsive to an increase in the power consumption of at least one functional unit having a relatively high priority, for reducing the power consumption of at least one of the functional units having a relatively low priority in proportion to said increase, when said preselected power limit is reached as a result of said increase in power consumption, such that a reduced level of power is supplied to said one functional unit having a relatively low priority after said preselected power limit is reached.

2. The circuit of claim 1, wherein said control means includes means for limiting the current supplied to a functional unit having a relatively high priority.

3. The circuit of claim 1, wherein said sensing means includes means for producing a control signal which is a function of the total power supplied to all of said functional units, and said control means includes a control circuit responsive to said control signal for reducing the power consumption of said one functional unit having said relatively low priority.

4. The circuit of claim 3, wherein said control signal producing means includes current sensing means for sensing the total current supplied to said functional units and means coupled with said current sensing means for generating a voltage related to the current sensed by said current sensing means.

5. The circuit of claim 4, wherein said voltage generating means includes a comparator having an output for producing said control signal, said output being connected with said control circuit.

6. The circuit of claim 3, wherein said control circuit includes means for producing a reference signal which is a function of said preselected limit of power consumption and means for comparing said control signal with said reference signal.

7. For use in delivering electrical power to line-fed subscriber stations in a telecommunications system, wherein at least certain of said stations include a plurality of functional units respectively having variable electrical power consumptions and differing priorities with respect to their functional importance, a method for limiting the total power consumed by all of the functional units of each of said certain stations to a preselected limit, wherein said preselected limit is lower than the sum of the maximum power consumptions of the respective functional units of each station, said method comprising the steps of:
 (A) sensing when the power consumption by all of said functional units reaches said preselected limit, the reaching of said preselected limit resulting at least in part from an increase in power consumption by at least one of said functional units having a relatively high priority; and,
 (B) after said preselected limit is sensed in step (A), reducing the power consumption of at least one of said functional units having a relatively low priority in proportion to said increase in power consumption by said one functional unit having a relatively high priority, such that a reduced level of power is supplied to said one functional unit having a relatively low priority after said preselected limit is reached.

8. A circuit for regulating the electrical power distributed from a source thereof via a telecommunications system to a plurality of functional units respectively having variable power consumptions and differing priorities, comprising:
 means for monitoring an increase in the total electrical power consumption of said plurality of functional units, including means for sensing an electrical parameter related to said electrical power consumption; and
 means coupled with said monitoring means for reducing the total electrical power delivered to at least certain of said functional units having a relatively low priority and in proportion to the increase in said power consumption monitored by said monitoring means, when the electrical power monitored by said monitoring means exceeds a predetermined value, such that power is supplied to said certain functional units at a reduced level after said predetermined value is exceeded.

9. The circuit of claim 8, including:
 distribution means coupled with said monitoring means for distributing electrical power from said monitoring means to each of said functional units, and wherein said sensing means includes means for measuring the electrical current through said distribution means.

10. The circuit of claim 8, including:
 distributor means coupled with said monitoring means for distributing electrical power from said source to each of said functional units, and wherein said sensing means includes means for measuring the electrical voltage potential applied to said distribution means by said source.

11. The circuit of claim 8, including:
 means for limiting the current delivered to at least one of said functional units having an intermediate priority.

12. The circuit of claim 8, wherein said monitoring means is operative to produce a control signal related to the electrical power consumption of said plurality of functional units, and wherein said power limiting means includes:
 a comparator device having a first and second input, and an output, said first input being coupled with said monitoring means to receive said control signal and said second input being coupled with a reference signal, said output producing an output signal when said reference signal is in a predefined relationship to said control signal.

13. The circuit of claim 12, wherein said control signal produced by said monitoring means is proportional to the power consumed by said plurality of functional modules, and wherein said reference signal is representative of a predefined maximum power limit beyond which said power limiting means will not allow said plurality of functional modules to exceed.

14. The circuit of claim 13, wherein said control signal produced by said monitoring means is defined by a voltage.

15. The circuit of claim 13, wherein said control signal produced by said monitoring means is defined by a current.

16. The circuit of claim 8, wherein said electrical parameter is the total voltage applied to all of said functional units and is used as a criterion to determine the total power consumption of all of said functional units.

17. The circuit of claim 8, wherein said electrical parameter is the total current supplied to all of said functional units and is used as a criterion to determine the total power consumption of all of said functional units.

* * * * *